UNITED STATES PATENT OFFICE.

JOHN R. HARE, OF BALTIMORE, MARYLAND.

METHOD OF DESICCATING SAUER-KRAUT.

No. 895,262.     Specification of Letters Patent.     Patented Aug. 4, 1908.

Application filed September 27, 1906. Serial No. 336,425.

*To all whom it may concern:*

Be it known that I, JOHN R. HARE, a subject of the King of Great Britain, residing at Baltimore, in the State of Maryland, have invented certain new and useful Improvements in Methods of Desiccating Sauer-Kraut; and I do hereby declare the following to be a full, clear, and exact description of the invention, such as will enable others skilled in the art to which it appertains to make and use the same.

This invention relates to novel improvements in the manufacture of dried food products, specifically the production of desiccated sauer kraut.

Its object is to enable sauer kraut to be prepared at propitious times and then preserved for long periods in its most palatable form, thus rendering it available as an article of diet in seasons when it is ordinarily not obtainable.

At present, the manufacture of good sauer kraut is a matter attended by considerable difficulty and uncertainty; and, owing to its instability, it has hitherto been impossible to keep it for any length of time, a sort of decomposition setting in after a short while and ruining the flavor. It has been particularly difficult to make good sauer kraut in the summer because of the high temperature, and keeping it at this season has been out of the question. For these reasons it has hitherto been far from easy to secure good sauer kraut in any seasons, and practically impossible to get it at all in the summer. The large amounts of sauer kraut which are made despite these serious difficulties attendant upon its manufacture and preservation serve as eloquent indication of the esteem in which this article of food is held, not only by those of German origin or descent, but by many others who have acquired a taste for the appetizing dish; and it is a real deprivation to many not to be able to obtain it at certain times. It may well be remembered, too, that the large quantities consumed annually may be regarded as representing other large quantities which have become spoiled and useless. There is, therefore, a very genuine want for a form of sauer kraut that will be available at any time and that will be possessed of all the attractive gustatory properties of sauer kraut at its best. I find that, by arresting the ripening of the kraut by desiccating with salt in the proper manner at just the right period in the acetic acid fermentation stage, the product will have, when properly prepared for the table, a most characteristically pleasing and appetizing flavor. Moreover, this dried kraut will keep for long periods, and will always have when cooked the same palatable qualities.

In carrying out my invention, the cabbage is first cut up or reduced to shreds. These shreds are then packed in alternate layers with salt in a suitable container or vessel, preferably of wood to avoid the formation of metallic acetates. A follower is placed on top of the whole to prevent the kraut, now in process of formation, from rising above the brine. The ripening of the mass must be superintended with great care; and at just the proper point in the acetic acid fermentation—the time that will have elapsed being determined by temperature and other conditions—the ripened kraut is removed from the brine and placed upon suitable supports, preferably reticulated stands or slabs, in contact with currents of dry air, preferably somewhat heated, conditions being so regulated as to produce a gradual drying. The drying shreds are from time to time carefully but thoroughly shaken up and the less dried portion brought into more direct contact with the currents of air. It is imperative that great care be taken that at this stage the kraut shall not come in contact with copper, when dangerous copper acetate might be formed, or indeed with other metals.

It is most desirable that, after the drying of the sauer kraut shall have proceeded to a certain degree, a re-salting or dry salting shall be effected. With a view to the nature of the final product it is best that the salt used at this and at the earlier stage of the process shall be as free from magnesium chlorid as possible, since it is this impurity which gives to common salt its familiar hygroscopic properties. It will be readily perceived that it is important that the finally dried kraut shall be as little liable as possible to the absorption of atmospheric moisture. The drying may now be further continued; but before completion of this step I contemplate shaping the material by packing in suitable molds, where it is allowed to remain for a time. The kraut will not be particularly compacted in these molds, but will retain its shape when removed therefrom. The drying is now completed; and the final product may be placed in packages, substantially airtight and waterproof if necessary, or in any suitable envelops to meet the requirements of the market.

The blocks of kraut should contain more salt than is permissible in an article of diet Previous, therefore, to preparation for the table, the product should be freshened by steeping in cold water, after which it may be cooked or treated in any desired manner. It is to be remembered that the kraut will swell to some extent when placed in water, and care must therefore be taken that too large amounts are not used.

It will be apparent that by means of my invention there is possible a very important extension of the usefulness of an article of diet which is particularly prized by a large portion of the population, and that the invention not only enables the kraut to be prepared at one season and consumed at another, but as well makes infinitely more certain than heretofore its manufacture and preservation at any season. Another advantage possessed by kraut in the form of the present invention is that it may be shipped for long distances with the greatest convenience, and without danger of spoiling.

What is claimed as new is:

The process of preparing desiccated sauer kraut, which consists in cutting cabbage and reducing it to shreds, packing said shreds in salt, subsequently removing the mass and subjecting it to a partial drying process, resalting the same and compressing it in suitable molds, removing it from the molds before drying action is complete, and subsequently entirely drying the same.

In testimony whereof, I affix my signature, in the presence of two subscribing witnesses.

JOHN R. HARE.

Witnesses:
ADRIAN J. GRAPE,
CHAS. A. NICHOLSON.